United States Patent
Gunda et al.

(10) Patent No.: US 9,122,641 B1
(45) Date of Patent: Sep. 1, 2015

(54) ON-PREMISE DATA DEDUPLICATION FOR CLOUD ENVIRONMENTS

(75) Inventors: Laxmikant Vithal Gunda, Pune Maharashtra (IN); Praveen N. Rakshe, Pune (IN)

(73) Assignee: Symantec Corporation, Mountian View, CA (US)

( * ) Notice: Subject to any disclaimer, the term of this patent is extended or adjusted under 35 U.S.C. 154(b) by 296 days.

(21) Appl. No.: 12/956,664

(22) Filed: Nov. 30, 2010

(51) Int. Cl.
*G06F 17/30* (2006.01)
*G06F 7/00* (2006.01)
*G06F 11/14* (2006.01)

(52) U.S. Cl.
CPC ........ *G06F 11/1458* (2013.01); *G06F 11/1469* (2013.01); *G06F 17/30067* (2013.01)

(58) Field of Classification Search
USPC .......................................................... 707/679
See application file for complete search history.

(56) References Cited

U.S. PATENT DOCUMENTS

| | | | |
|---|---|---|---|
| 5,990,810 A | 11/1999 | Williams | 341/51 |
| 7,822,939 B1 | 10/2010 | Veprinsky et al. | 711/170 |
| 7,921,086 B1 | 4/2011 | Bromley et al. | 707/692 |
| 8,234,468 B1 | 7/2012 | Deshmukh et al. | 711/162 |
| 8,280,854 B1 | 10/2012 | Emmert | 707/664 |
| 2008/0244204 A1 | 10/2008 | Cremelie et al. | 711/162 |
| 2008/0310628 A1* | 12/2008 | Fujioka et al. | 380/201 |
| 2009/0083563 A1 | 3/2009 | Murase | 713/324 |
| 2010/0031086 A1 | 2/2010 | Leppard | 714/15 |
| 2010/0058013 A1 | 3/2010 | Gelson et al. | 711/162 |
| 2010/0077013 A1* | 3/2010 | Clements et al. | 707/822 |
| 2010/0077161 A1 | 3/2010 | Stoakes et al. | 711/162 |
| 2010/0094817 A1* | 4/2010 | Ben-Shaul et al. | 707/697 |
| 2010/0106754 A1 | 4/2010 | Condit et al. | 707/822 |
| 2010/0198797 A1 | 8/2010 | Wideman | 707/692 |
| 2011/0099154 A1* | 4/2011 | Maydew et al. | 707/692 |
| 2011/0231362 A1* | 9/2011 | Attarde et al. | 707/609 |
| 2011/0307447 A1 | 12/2011 | Sabaa et al. | 707/637 |
| 2012/0036319 A1 | 2/2012 | Bondurant | 711/111 |
| 2012/0124011 A1* | 5/2012 | Spackman et al. | 707/692 |
| 2013/0212074 A1 | 8/2013 | Romanski et al. | 707/692 |

OTHER PUBLICATIONS

Bromley, Graham, U.S. Appl. No. 12/766,177 entitled "Self-Referential Deduplication," filed Apr. 23, 2010.
Karr, Ronald, et al., U.S. Appl. No. 13/716,123 entitled "Deduplication Featuring Variable-Size Duplicate Data Detection and Fixed-Size Data Segment Sharing," filed Dec. 15, 2012.

* cited by examiner

*Primary Examiner* — Kuen Lu
(74) *Attorney, Agent, or Firm* — Campbell Stephenson LLP (57) ABSTRACT

A first computer system calculates a first value as a function of a data block. A second computer system compares the calculated first value with each of a plurality of values in a plurality of entries, respectively. The plurality of entries include a plurality of storage location pointers, respectively, that correspond to a plurality of data blocks, respectively, that were transmitted to a storage system before the first computer system calculated the first value. If the first value compares equally to a value contained in one of the plurality of entries, a storage location pointer of the one entry is transmitted to the storage system, wherein the storage location pointer corresponds to a copy of the data block that was sent to the storage system before the first computer system calculated the first value. If the calculated first value does not compare equally with any value contained in the plurality of entries, the first computer system transmits the data block to the storage system.

22 Claims, 6 Drawing Sheets

ON-PREMISE DATA DEDUPLICATION FOR CLOUD ENVIRONMENTS

BACKGROUND OF THE INVENTION

Deduplication can reduce the size of data objects such as backup copies of files systems. Deduplication reduces backup copy size by eliminating duplicated data, and thus only one unique copy of multiple instances of the same data is actually retained on backup storage. For example, a typical file system might contain 100 instances of the same one megabyte (MB) file. If the file system is copied to backup storage, all 100 instances are saved. With deduplication, only one instance of the file is copied to backup storage; each subsequent instance is referenced back to the one saved copy. Thus, a 100 MB backup storage demand could be reduced to one MB. Deduplication can also reduce the throughput requirements of a data communication link coupled to backup storage; less bandwidth is needed for the communication link to transmit one MB to/from backup storage when compared to the requirements needed to transmit 100 MB.

Deduplication generally operates at the file or block level. File deduplication eliminates duplicate files, but this is not a very efficient means of deduplication. Block deduplication looks within a file and saves unique instances of each block portion of a predetermined size (e.g., 512 bytes). If a file is subsequently updated, only the changed data is saved during the next backup operation. That is, if only a few bits of a file are changed, then only the changed block or blocks are saved. This behavior makes block level deduplication far more efficient. Various embodiments of deduplication will be described herein with reference to block level deduplication of file system backup copies. However, the deduplication described herein may be employed with respect to data objects other than file system backup copies.

Cloud storage services are becoming popular to businesses seeking to reduce their storage costs. A cloud storage service might implement deduplication, but this is only a convenience for the cloud storage service provider and does not address critical problems such as throughput to the cloud storage service over a WAN as experienced by a data protection application such as backup/restore.

SUMMARY OF THE INVENTION

Disclosed is a method that includes a first computer system that calculates a first value as a function of a data block. A second computer system compares the calculated first value with each of a plurality of values in a plurality of entries, respectively. The plurality of entries include a plurality of storage location pointers, respectively, that correspond to a plurality of data blocks, respectively, that were transmitted to a storage system before the first computer system calculated the first value. If the first value compares equally to a value contained in one of the plurality of entries, a storage location pointer of the one entry is transmitted to the storage system, wherein the storage location pointer corresponds to a copy of the data block that was sent to the storage system before the first computer system calculated the first value. If the calculated first value does not compare equally with any value contained in the plurality of entries, the first computer system transmits the data block to the storage system. The method may further include receiving a new storage location pointer from the storage system in response to the first computer system transmitting the data block to the storage system, the second computer system creating a new entry if the calculated first value does not compare equally with any value contained in the plurality of entries, and storing the calculated first value and the new storage location pointer in the new entry. The method may further include another computer system calculating a second value as a function of another data block, wherein the second value is distinct from the first value, the second computer system comparing the calculated second value with each of the plurality of values in the plurality of entries, respectively, wherein the plurality of entries comprising the plurality of storage location pointers, respectively, that correspond to the plurality of data blocks, respectively, transmitted to the storage system before the other computer system calculates the second value. If the second value compares equally to a value contained in another of the plurality of entries, a storage location pointer of the other entry is transmitted to the storage system, wherein the storage location pointer of the other entry corresponds to a copy of the other data block that was sent to the storage system before the other computer system calculated the second value, and if the calculated second value does not compare equally with any value contained in the plurality of entries, the second computer system transmits the other data block to the storage system. In one embodiment, if the calculated first value compares equally with one in the plurality of entries, the second computer system forwards the storage location pointer to the first computer system before the first computer system transmits the storage location pointer to the storage system. In one embodiment of the method, the storage system deduplicates data blocks it receives from the first computer system. In one embodiment of the method, the first computer system generates the first value during a backup operation of a data object accessible by the computer system. In yet another embodiment of the method, the storage location pointer comprises a file name and an offset from a starting memory address corresponding to the file name. The method may further include the first computer restoring a data object to a prior point in time, wherein restoring the data object may include; overwriting a data block of the data object with a backup copy of the data block received from the storage system; storing the backup copy in a cache; calculating a second value as a function of the backup copy; comparing the calculated second value with each of a plurality of values in a plurality of entries to find a matching value, and; mapping the storage location pointer of the entry with the matching value to the backup copy stored in the cache. The method may also include the first computer restoring a data object to a prior point in time, wherein restoring the data object comprises; receiving a second storage location pointer from the storage system; in response to receiving the second storage location pointer, generating and sending a message to the storage system, the message comprising the second storage location; receiving a second data block from the storage system in response to sending the message to the storage system, wherein the second data block is stored at a memory location identified by the second storage location pointer.

The present disclosure also teaches one or more computer readable mediums (CRMs) that store instructions, wherein a method is implemented in response to executing the instructions, the method including receiving a first value from a first computer, wherein the first value was calculated by the first computer as a function of a data block; comparing the first value with each of a plurality of values in a plurality of entries, respectively, the plurality of entries comprising a plurality of storage location pointers, respectively, that correspond to a plurality of data blocks, respectively, that were transmitted to a storage system before the first value was calculated; if the first value compares equally to a value contained in one of the plurality of entries, generating an instruction to transmit a storage location pointer of the one entry to the storage system, wherein the storage location pointer corresponds to a copy of the data block that was sent to the storage system before the first value was calculated; if the calculated first value does not compare equally with any value contained in the plurality of entries, generating an instruction to transmit the data block to the storage system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
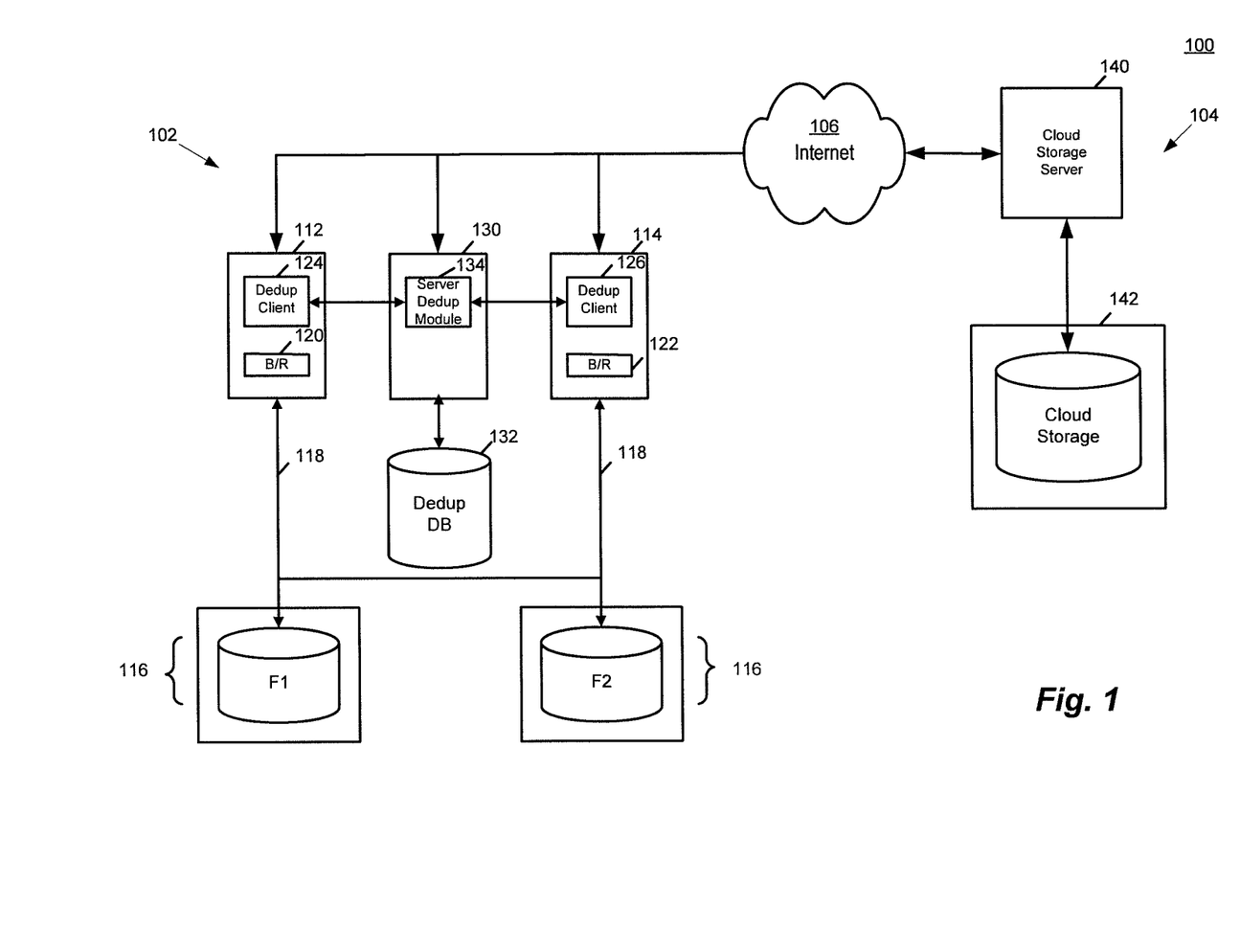
FIG. 1 graphically illustrates relevant components of an example system that employs deduplication.

FIG. 1 illustrates in block diagram form relevant components of an example networked system 100 that employs data deduplication. The networked system 100 includes a primary computing system 102 in data communication with a cloud storage system 104 via a wide area network (e.g., the Internet). The primary computer system 102 include media servers 112 and 114 coupled to primary storage 116 via a communication link such as a storage area network (SAN) 118 that may include multiple components such as switches, routers, bridges, etc. Primary storage 116 may include one or more storage devices (e.g., disk arrays) that store volumes, which in turn may store respective file systems F1 and F2 that are accessible by media servers 112 and 114, respectively.

Media servers 112 and 114 may include data protection modules 120 and 122, respectively. For purposes of explanation only, data protection modules will take form in backup/restore (B/R) modules, it being understood that the term data protection should not be limited thereto. Backup and restore operations performed by B/R modules 112 and 114 are well known in the art. B/R modules can create backup copies of file systems at regularly scheduled intervals (e.g., every Sunday at 2 a.m.). When needed, a B/R module can restore a file system, or a portion thereof, to a prior data state using any one of the previously created backup copies, or portions thereof.

FIG. 1 also includes a deduplication server 130 in data communication with a deduplication database 132. Deduplication database 132 includes a plurality of records or entries, each of which may include a hash value for a respective data block in addition to a pointer that indicates where the data block is stored and can be retrieved. Although not shown, the deduplication database 132 may be stored directly or indirectly in a data object created from memory of one or more storage devices of primary storage 116 and accessible via SAN 118. In another embodiment, deduplication database 132 may be contained in storage that is local to deduplication server 130.

Media servers 112 and 114 include deduplication clients 124 and 126, respectively, which in one embodiment take form in instructions executing on one or more processors. Deduplication server 130 includes a deduplication module 134, which in one embodiment takes form in instructions executing on one or more processors. Deduplication module 134 is in data communication with deduplication clients 124 and 126 of media servers 112 and 114, respectively. As will be more fully described, deduplication clients 124 and 126, acting in concert with deduplication module 134, deduplicate backup copies of file systems F1 and F2, respectively.

Cloud storage 104 of FIG. 1 includes a cloud storage server 140, which in turn, is in data communication with cloud storage system 142. The combination provides a service for storing deduplicated backup copies of file systems F1 and F2. For purposes of explanation only, it will be presumed that could storage server 140 also employs deduplication. In other words, cloud storage server 140 can deduplicate the deduplicated backup copies it receives from primary system 102 and other computer systems (not shown). Cloud storage server 140 can provide cloud storage location pointers P that point to or identify locations within storage 142 where data blocks of backup copies can be found. These pointers may be provided to deduplication client 124, deduplication client 126 or deduplication module 134 upon request or in response to receiving data blocks.

As noted deduplication client 124 or 126, acting in concert with deduplication module 134, can deduplicate a backup copy of file system F1 or F2, respectively. The remaining disclosure will describe deduplication of backup copies with reference to deduplication client 124. However, it should be understood that the concepts described herein apply equally with respect to deduplication client 126 acting in concert with deduplication module 134 in order to deduplicate backup copies of file system F2.

Figure 2:
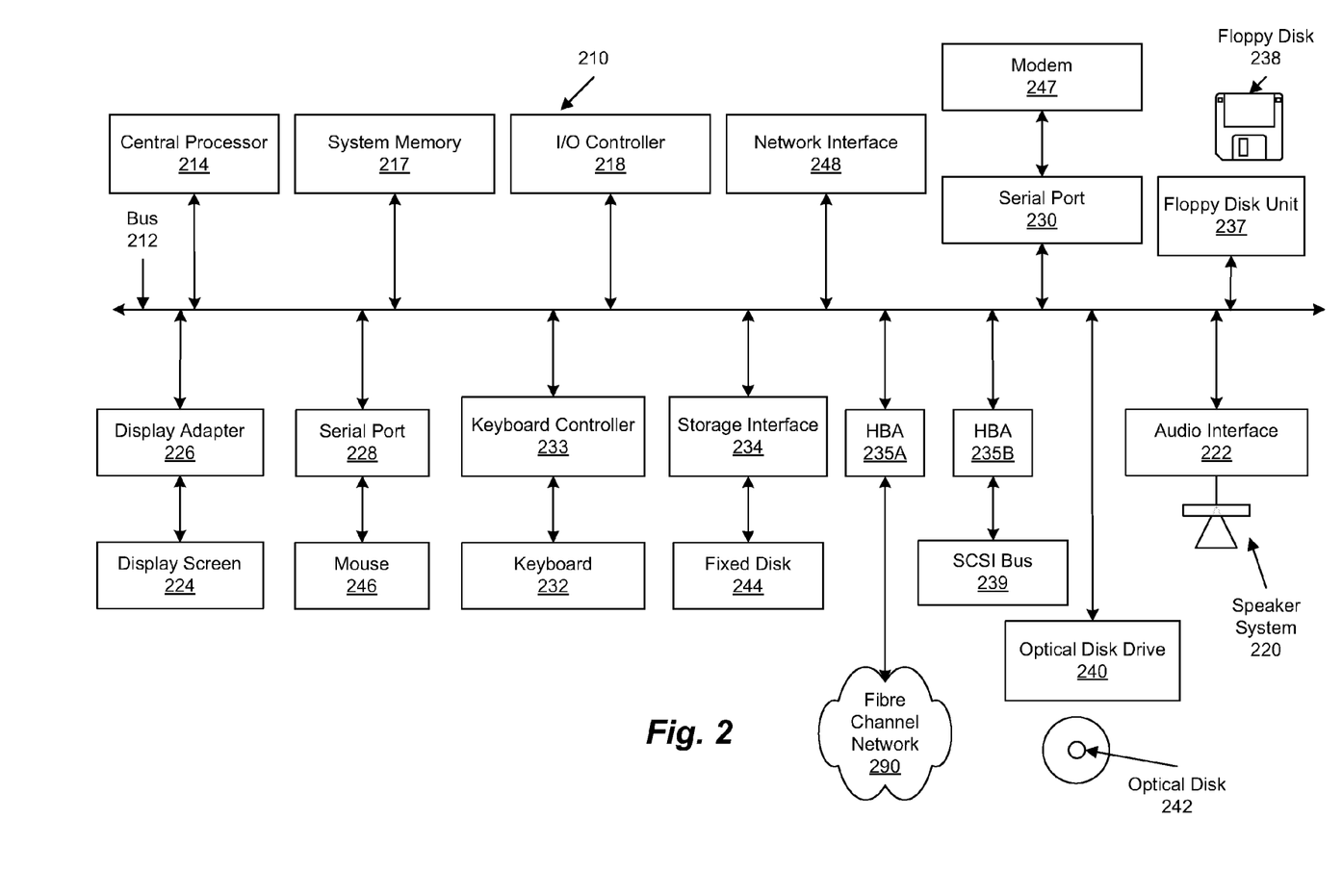
FIG. 2 is a block diagram of an example computer system that may be employed in the system of FIG. 1.

FIG. 2 depicts a block diagram of an computer system 210 suitable for implementing the present disclosure or portions thereof. Computer system 210 may be illustrative of various computer systems (e.g., servers) shown in FIG. 1. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

The operation of a computer system such as that shown in FIG. 2 is readily known in the art and is not discussed in detail in this application. Code for implementing the present disclosure can be stored in computer-readable storage media such as one or more of system memory 217, fixed disk 244, optical disk 242, or floppy disk 238. Memory 220 is also used for storing temporary variables or other intermediate information during the execution of instructions by the processor 210. The operating system provided on computer system 210 may be MS-DOS®, MS-WINDOWS®, OS/2®, UNIX®, Linux®, or another known operating system.

Figure 3:
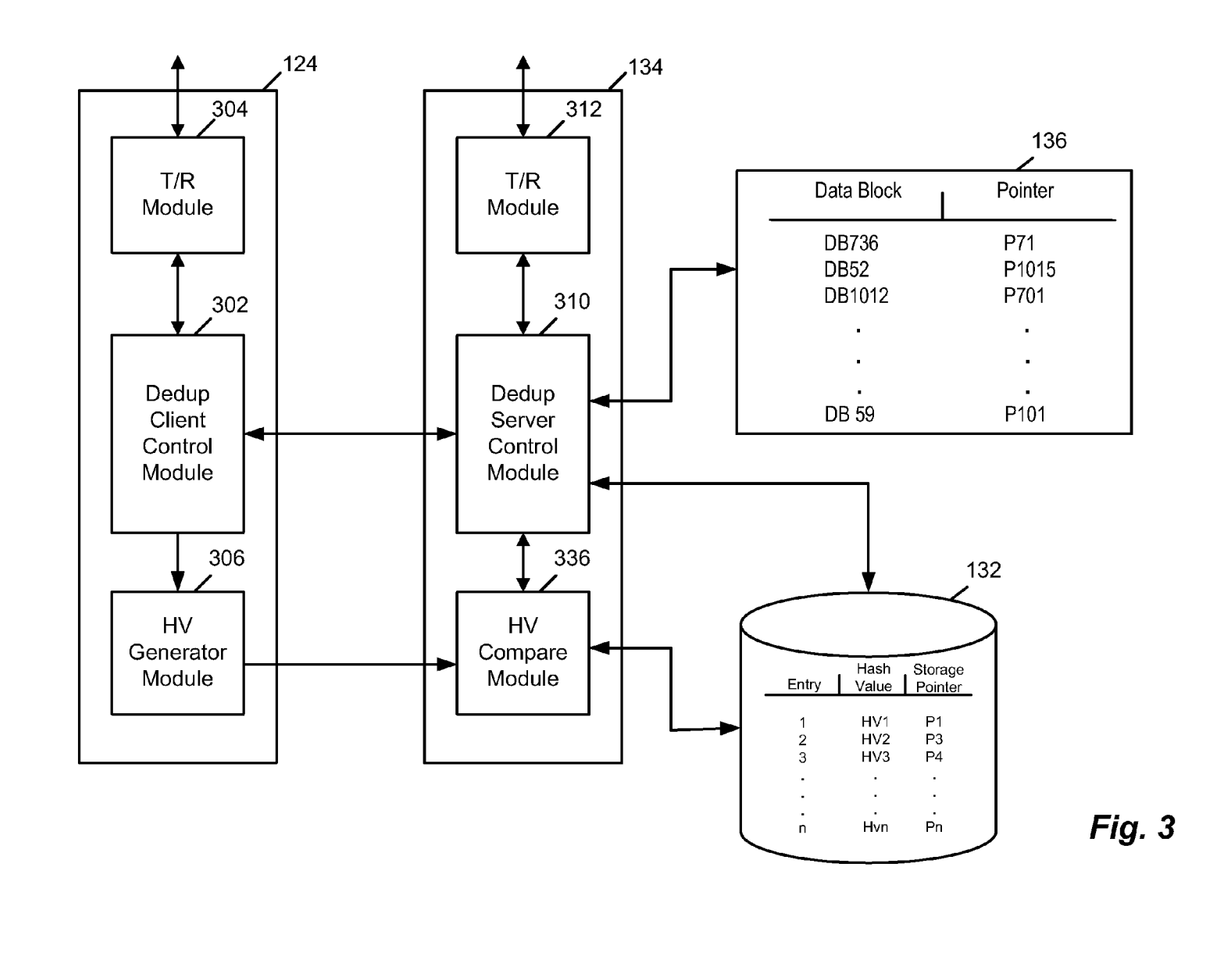
FIG. 3 is a block diagram of an example deduplication client and an example deduplication module employed in FIG. 1
Figure 4:
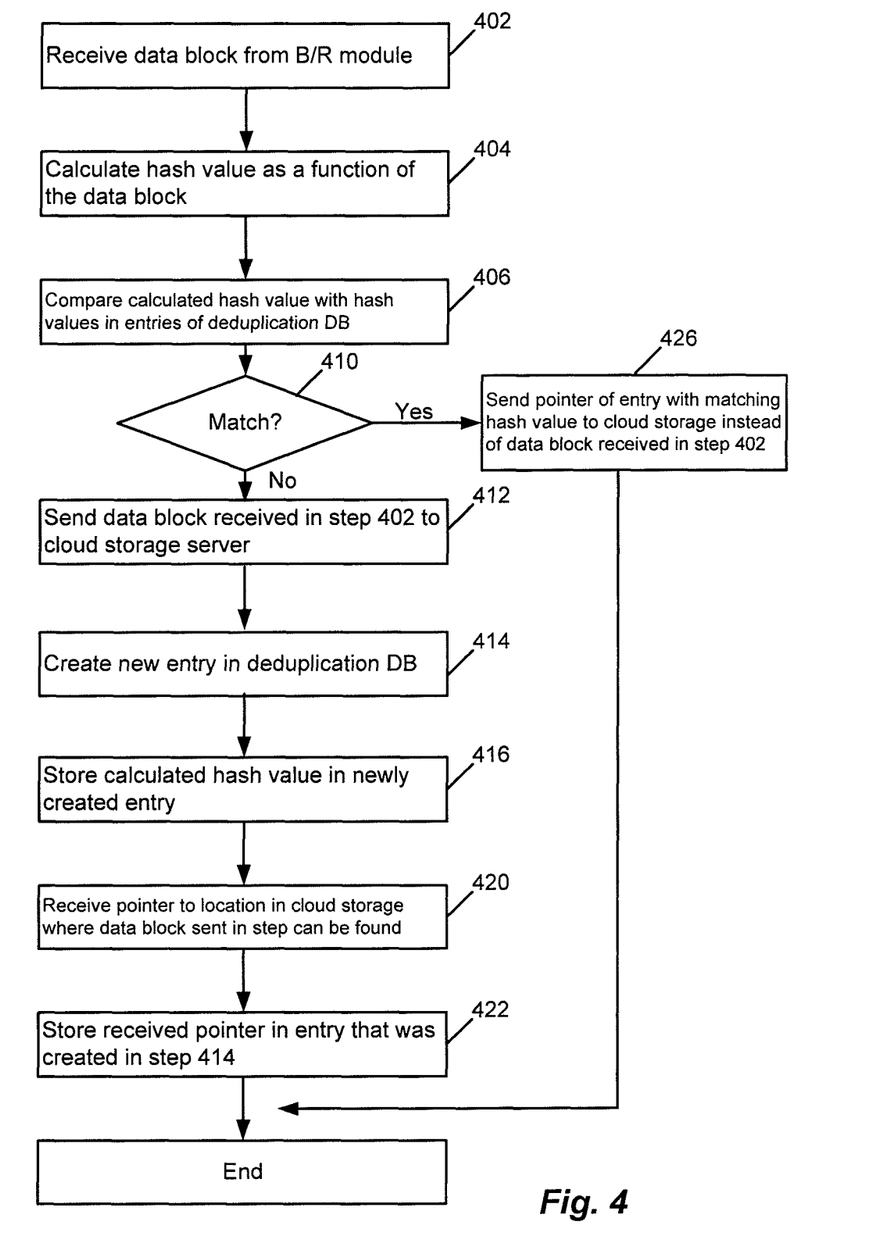
FIG. 4 is a flow chart that illustrates relevant aspects of a process used during deduplication of a backup copy.

FIG. 3 illustrates in block diagram form relevant components of an example deduplication client 124 and an example deduplication module 134. As noted, deduplication client 124 and deduplication module 134 can deduplicate a backup copy of file system F1 during a regularly scheduled backup operation. With continuing reference to FIGS. 1 and 3, FIG. 4 illustrates relevant aspects of an example deduplication process. At step 402, both deduplication client control module 302 (FIG. 3) and hash value (HV) generator module 306 (FIG. 3) receive the same data block from B/R module 120 (FIG. 1) during a backup operation of file system F1. In step 404, HV generator module 306 generates a hash value as a function of the data block using any one of several well known hash algorithms such as MD5 or SHA-1.

The hash value, once generated, is transmitted to HV compare module 336 (FIG. 3) of deduplication module 134.

In step 406, HV compare module 336 compares the hash value calculated in step 404 with hash values contained within the entries or records of deduplication database 132. In one embodiment, each entry in deduplication database 132 includes a hash value HVx and corresponding pointer Px. Each hash value HVx was calculated as a function of a respective data block, which is stored in cloud storage 142 at a location identified by cloud storage location pointer Px. In one embodiment, the size of pointers should be less than the size of data blocks received in step 402.

If HV compare module 336 detects a match between the hash value that was calculated in step 404 and a hash value contained within deduplication database 132, then HV compare module 336 reads the pointer contained within the entry having the matching hash value, and alerts deduplication server control module 310 (FIG. 3). Deduplication server control module 310 in response sends the pointer to deduplication client control module 302 along with an instruction to send the pointer to cloud storage server 140 instead of the data block that deduplication client control module 302 received in step 402. In one embodiment, the pointer and instruction can be sent to deduplication client control module 302 in a single message. At step 426, deduplication client control module 302 sends the pointer it receives and the process ends.

If, however, HV compare module 336 does not find a match in step 410, deduplication server control module 310 instructs deduplication client control module 302 to send the data block it received in step 402 to cloud server 140. At step 412 deduplication client control module 302 sends the data block as instructed via T/R (transmit/receive) module 304. Deduplication server control module 310 then creates a new entry in deduplication database 132 as shown in step 414 using, for example, a SQL Insert command. The new entry may include the hash value generated in step 404, or as shown in step 416 deduplication server control module 310 may store a copy of the newly generated hash value in the newly created entry using, for example, a SQL Update command.

After the data block received in step 402 is sent to cloud storage server 140, deduplication server control module 310 or deduplication client 124 may generate and send a request for a storage location pointer where cloud storage server 140 stores the data block sent in step 412. In another embodiment, storage server 140 may return the pointer regardless of whether it receives a request for it. For purposes of explanation only, the remaining disclosure will presume that deduplication server control module 310 receives the cloud storage location pointer from cloud storage server 140 upon request. Upon receipt, deduplication server control module 310 in step 420 stores the received pointer in the entry created in step 414 and the process ends. The process shown in FIG. 4 repeats with each new data block received from B/R module 120.

Figure 5:
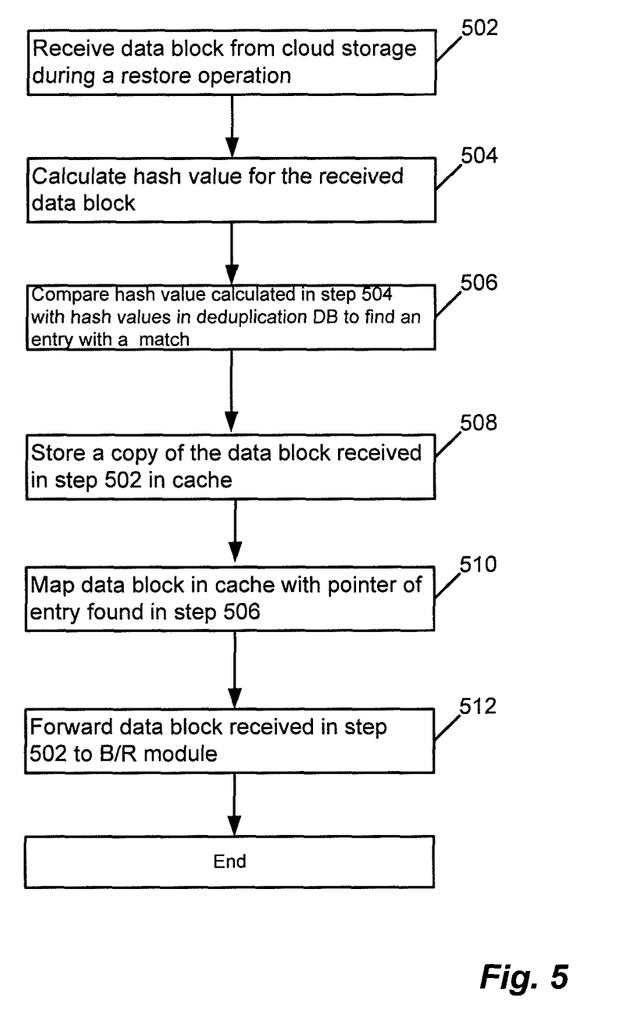
FIG. 5 is a flow chart that illustrates relevant aspects of a process employed during reflation of a deduplicated backup copy.
Figure 6:
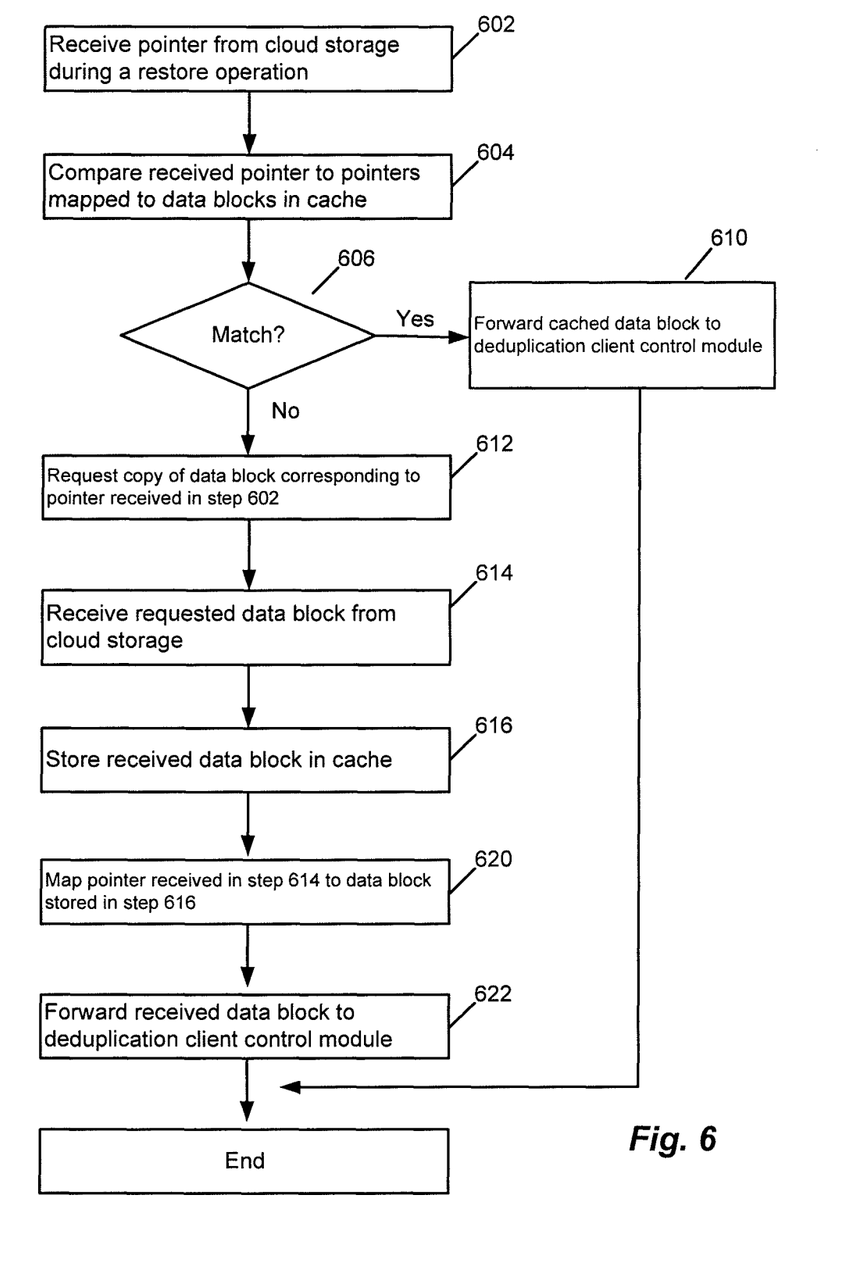
FIG. 6 is a flow chart that illustrates relevant aspects of another process employed during reflation of a deduplicated backup copy.

File system F1 stored in primary storage 114 is subject to data corruption, which can occur as a result of hardware, software, or human error. When corrupted, B/R module 120 can restore file system F1, or a portion thereof, to a prior data state using a backup copy, which is stored in cloud storage 142 in deduplicated form. The backup copy can be recreated by de-deduplicating or reflating the corresponding deduplicated backup copy. FIGS. 5 and 6 illustrate relevant operational aspects implemented by deduplication client 124 and deduplication module 134 when reflating a deduplicated backup copy.

Reflation may initiate when B/R module 120 generates a request for a backup copy, which can be used to correct data corruption. The request may identify the backup copy sought. In response to receiving the request, deduplication client 124 may generate a corresponding request that it sends to cloud storage server 140. This request may also identify the corresponding deduplicated backup copy. Cloud storage server 140 in response to receiving this request, returns the requested deduplicated backup copy, which includes a stream of storage location pointers P intermixed with data blocks.

With continuing reference to FIGS. 1 and 3, FIGS. 5 and 6 illustrate relevant operational aspects implemented by deduplication client control module 302 and deduplication server control module 310 when reflating a deduplicated backup copy. The process of FIG. 5 initiates when deduplication client control module 302 receives a data block from cloud storage server 140. In response to receiving the data block in step 510, deduplication client control module 302 forwards a copy to deduplication server control module 310, HV generation module 306, and B/R module 120 (FIG. 1). B/R module 120 overwrites a corresponding data block in file system F1 with the data block it receives from deduplication client control module 302. In step 504, HV generator module 306 calculates a hash value for the data block received in step 504. HV generator module 306 forwards the newly calculated hash value to HV compare module 336, which accesses deduplication database 132 to find a match therein. Deduplication server control module 310 stores the data block it receives from deduplication client control module 302 into cache 136 at step 508. Further, the pointer from deduplication table 132 in the entry that contains the matching hash value, is provided to deduplication server control module 310, which in turn maps the pointer to the data block that was stored within cache 136 at step 508.

In an alternative embodiment, cloud storage server 140 could send a pointer with each data block of the deduplicated backup copy. In this embodiment, deduplication client control module 302 receives the combination of data block and corresponding pointer, and deduplication client control module 302 forwards the combination to deduplication server control module 310, which in turn stores the data block into cache 136, mapped to its corresponding pointer. This alternative method avoids the added step of generating a hash value, which in turn is used to identify a corresponding pointer within deduplication database 132.

As noted above, the stream from cloud storage service 140 may include pointers to data blocks. FIG. 6 illustrates relevant aspects of the reflation process when deduplication client 124 receives a pointer P rather than a data block. In step 602, deduplication client control module 302 receives a pointer from cloud storage server 140. Deduplication client control module 302 forwards the received pointer to deduplication server control module 310, which in turn compares the pointer with those mapped to data blocks in cache 136 as shown in step 604. If a match is found in step 606, deduplication server control module 310 reads the data block that is mapped to the matching pointer, and forwards the data block to deduplication client control module 302 in step 610, which in turn forwards the copy of the data block to B/R module 120. If no match is found between the pointer received in step 602 and a pointers mapped to a data block in cache 136, in step 612 deduplication server control module 310 generates a request for a copy of the data block located at the pointer P, which is sent to cloud storage server 140. In response, cloud storage server 140 returns the data block to deduplication server control module 310, which in turn maps the data block in cache 136 to the pointer received in step 602, before sending a copy to deduplication client control module 302.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
a first computer system calculating a first value as a function of a data block;
a second computer system comparing the first value with each of a plurality of values in a plurality of entries, respectively, wherein
the plurality of entries comprise a plurality of storage location pointers, respectively, that correspond to a plurality of data blocks, respectively, that were transmitted to a cloud storage system before the first computer system calculates the first value;
if the first value compares equally to a value contained in one entry of the plurality of entries, the second computer system transmitting a first instruction and a storage location pointer of the one entry to the first computer system, wherein
the first instruction is configured to instruct the first computer system to transmit the storage location pointer of the one entry to the cloud storage system, and
the storage location pointer of the one entry corresponds to a copy of the data block that was sent to the cloud storage system before the first computer system calculated the first value; and
if the first value does not compare equally with any value contained in the plurality of entries, the second computer system transmitting a second instruction to the first computer system, wherein
the second instruction is configured to instruct the first computer system to transmit the data block to the cloud storage system.

2. The method of claim 1 further comprising:
the second computer system receiving a new storage location pointer from the cloud storage system in response to the first computer system transmitting the data block to the cloud storage system, wherein
the new storage location pointer corresponds to a storage location of the data block in the cloud storage system;
the second computer system creating a new entry in the plurality of entries if the first value does not compare equally with any value contained in the plurality of entries; and
storing the first value and the new storage location pointer in the new entry.

3. The method of claim 1 further comprising:
a third computer system calculating a second value as a function of a second data block, wherein the second value is distinct from the first value;
the second computer system comparing the second value with each of the plurality of values in the plurality of entries, respectively, wherein
the plurality of entries comprises the plurality of storage location pointers, respectively, that correspond to the plurality of data blocks, respectively, that were transmitted to the cloud storage system before the third computer system calculated the second value;
if the second value compares equally to a value contained in a second entry of the plurality of entries, the second computer system transmitting a third instruction and a second storage location pointer of the second entry to the third computer system, wherein
the third instruction is configured to instruct the third computer system to transmit the second storage location pointer of the second entry to the cloud storage system, and
the second storage location pointer of the second entry corresponds to a copy of the second data block that was sent to the cloud storage system before the third computer system calculated the second value; and
if the second value does not compare equally with any value contained in the plurality of entries, the second computer system transmitting a fourth instruction to the third computer system, wherein
the fourth instruction is configured to instruct the third computer system to transmit the second data block to the cloud storage system.

4. The method of claim 3, wherein the cloud storage system deduplicates data blocks received from the first computer system and the third computer system.

5. The method of claim 1 wherein, if the first value compares equally with the one entry of the plurality of entries, the second computer system forwards the storage location pointer of the one entry to the first computer system before the first computer system transmits the storage location pointer of the one entry to the cloud storage system.

6. The method of claim 1 wherein the first computer system generates the first value during a backup operation of a data object accessible by the first computer system.

7. The method of claim 1 wherein the storage location pointer comprises a file name and an offset from a starting memory address corresponding to the file name.

8. The method of claim 1 further comprising:
   the first computer system restoring a data object to a prior point in time, wherein the restoring the data object comprises
      overwriting a data block of the data object with a backup copy of the data block received from the cloud storage system;
   the second computer system storing the backup copy in a cache;
   the second computer system calculating a second value as a function of the backup copy;
   the second computer system comparing the second value with each of the plurality of values in the plurality of entries to find a matching value; and
   the second computer system mapping a second storage location pointer of an entry comprising the matching value to the backup copy stored in the cache.

9. The method of claim 1 further comprising:
   the first computer system restoring a data object to a prior point in time, wherein the restoring the data object comprises
      receiving a second storage location pointer from the cloud storage system;
   in response to receiving the second storage location pointer, generating and sending a message to the second computer system, wherein
      the message comprises the second storage location pointer;
   the second computer system comparing the second storage location pointer with a second plurality of storage location pointers in a cache; and
   the first computer system receiving a second data block from the second computer system in response to finding the second storage location pointer in the cache, wherein
      the second data block is mapped to the second storage location pointer in the cache.

10. The method of claim 1, wherein the cloud storage system is coupled to the first computer system and the second computer system via a wide area network.

11. One or more non-transitory computer readable mediums (CRMs) comprising instructions, wherein a method is implemented in response to executing the instructions, the method comprising:
   receiving a first value from a first computer system, wherein the first value was calculated by the first computer system as a function of a data block;
   comparing the first value with each of a plurality of values in a plurality of entries, respectively, wherein
      the plurality of entries comprise a plurality of storage location pointers, respectively, that correspond to a plurality of data blocks, respectively, that were transmitted to a cloud storage system before the first value was calculated;
   if the first value compares equally to a value contained in one entry of the plurality of entries, transmitting a first instruction and a storage location pointer of the one entry to the first computer system, wherein
      the first instruction is configured to instruct the first computer system to transmit the storage location pointer of the one entry to the cloud storage system, and
      the storage location pointer of the one entry corresponds to a copy of the data block that was sent to the cloud storage system before the first value was calculated; and
   if the first value does not compare equally with any value contained in the plurality of entries, transmitting a second instruction to the first computer system, wherein
      the second instruction is configured to instruct the first computer system to transmit the data block to the cloud storage system.

12. The one or more non-transitory CRMs of claim 11 wherein the method further comprises:
   creating a new entry in the plurality of entries if the first value does not compare equally with any value contained in the plurality of entries; and
   storing the first value and a new storage location pointer in the new entry in response to receiving the new storage location pointer from the cloud storage system, wherein
      the new storage location pointer corresponds to a storage location of the data block in the cloud storage system.

13. The one or more non-transitory CRMs of claim 11 wherein the method further comprises:
   receiving a second value that was calculated by a second computer system, wherein
      the second value was calculated as a function of a second data block, and
      the second value is distinct from the first value;
   comparing the second value with each of the plurality of values in the plurality of entries, respectively, wherein
      the plurality of entries comprises the plurality of storage location pointers, respectively, that correspond to the plurality of data blocks, respectively, that were transmitted to the cloud storage system before the second value was calculated by the second computer system;
   if the second value compares equally to a value contained in a second entry of the plurality of entries, transmitting a third instruction and a second storage location pointer of the second entry to the second computer system, wherein
      the third instruction is configured to instruct the second computer system to transmit the second storage location pointer of the second entry to the cloud storage system, and
      the second storage location pointer of the second entry corresponds to a copy of the second data block that was sent to the cloud storage system before the second value was calculated by the second computer system; and
   if the second value does not compare equally with any value contained in the plurality of entries, transmitting a fourth instruction to the second computer system, wherein
      the fourth instruction is configured to instruct the second computer system to transmit the second data block to the cloud storage system.

14. The one or more non-transitory CRMs of claim 11 wherein the first value was generated during a backup operation of a data object accessible by the first computer system.

15. The one or more non-transitory CRMs of claim 11 wherein the method further comprises:
the storage location pointer comprises a file name and an offset from a starting memory address corresponding to the file name.

16. The one or more non-transitory CRMs of claim 11 wherein the method further comprises:
receiving a backup copy of the data block from the first computer system during restoration of a data object;
storing the backup copy in a cache;
calculating a second value as a function of the backup copy;
comparing the second value with each of the plurality of values in the plurality of entries to find a matching value; and
mapping a second storage location pointer of an entry comprising the matching value to the backup copy stored in the cache.

17. The one or more non-transitory CRMs of claim 11 wherein the method further comprises:
receiving a second storage location pointer from the first computer system; and
in response to receiving the second storage location pointer, comparing the second storage location pointer with a second plurality of storage location pointers in a cache;
retrieving a second data block from the cache, wherein the second data block is mapped to the second storage location pointer in the cache.

18. A method comprising:
a first computer system sending a request for a deduplicated backup copy of data to a cloud storage system, wherein
the deduplicated backup copy of data was previously transmitted to the cloud storage system;
the first computer system receiving a first storage location pointer from the cloud storage system, wherein
the deduplicated backup copy of data comprises the first storage location pointer;
a second computer system retrieving a copy of a first data block from a cache, wherein
the copy of the first data block is mapped to the first storage location pointer in the cache;
the second computer system forwarding the copy of the first data block to the first computer system; and
the first computer system overwriting a data block of a data object with the copy of the first data block that was received from the second computer system.

19. The method of claim 18 further comprising:
the first computer system receiving a second data block from the cloud storage system, wherein
the deduplicated backup copy of data comprises the second data block;
the second computer system storing the second data block in the cache;
the second computer system calculating a second value as a function of the second data block;
the second computer system comparing the second value with each of a plurality of values in a plurality of entries to find a matching value; and
the second computer system mapping a second storage location pointer to the second data block stored in the cache, wherein the second storage location pointer is stored in an entry of the plurality of entries comprising the matching value.

20. The method of claim 19 further comprising:
generating and sending a request for the second storage location pointer that is associated with the second data block, in response to determining that the second value does not match any of the plurality of values;
receiving the second storage location pointer from the cloud storage system; and
mapping the second storage location pointer to the second data block stored in the cache.

21. The method of claim 19 wherein the second value is calculated by the second computer system using a hashing algorithm.

22. The method of claim 18, further comprising:
the second computer system comparing the first storage location pointer with a plurality of storage location pointers in the cache;
the second computer system generating and sending a request for the copy of the first data block, in response to determining that the first storage location pointer does not match any of the plurality of storage location pointers;
the second computer system receiving the copy of the first data block from the cloud storage system; and
the second computer system mapping the copy of the first data block to the first storage location pointer in the cache.

* * * * *